(12) United States Patent
Morihiro et al.

(10) Patent No.: US 7,420,014 B2
(45) Date of Patent: Sep. 2, 2008

(54) THICKENER FOR WATER-BASED VIBRATION DAMPER

(75) Inventors: Shigeyasu Morihiro, Osaka (JP); Yukihiro Miyawaki, Kobe (JP); Takahiro Miwa, Takatsuki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/669,860

(22) Filed: Sep. 24, 2003

(65) Prior Publication Data

US 2004/0072943 A1 Apr. 15, 2004

(30) Foreign Application Priority Data

Sep. 26, 2002 (JP) .............................. 2002-281245

(51) Int. Cl.
*C08L 33/02* (2006.01)
(52) U.S. Cl. ...................... 524/558; 524/560; 524/556; 524/501
(58) Field of Classification Search ................ 524/558, 524/560, 556, 501
See application file for complete search history.

(56) References Cited

U.S. PATENT DOCUMENTS

| 3,890,292 | A | * | 6/1975 | Bohme et al. ............... 526/240 |
| 4,138,381 | A | * | 2/1979 | Chang et al. ................ 524/765 |
| 4,230,844 | A | * | 10/1980 | Chang et al. ................ 526/210 |
| 4,764,554 | A | * | 8/1988 | Tonge ........................ 524/558 |
| 4,801,671 | A | * | 1/1989 | Shay et al. .................. 526/214 |
| 5,324,765 | A | * | 6/1994 | Mondet et al. .............. 524/423 |
| 5,478,602 | A | * | 12/1995 | Shay et al. .................. 427/389 |
| 5,610,215 | A | * | 3/1997 | Nonweiler et al. .......... 524/376 |
| 5,705,553 | A | * | 1/1998 | Kuropka ..................... 524/459 |
| 5,814,374 | A | * | 9/1998 | Nkansah et al. ............. 427/386 |
| 6,245,410 | B1 | | 6/2001 | Hahnle et al. ............... 428/132 |
| 6,646,058 | B1 | * | 11/2003 | Koger ........................ 525/301 |

FOREIGN PATENT DOCUMENTS

| EP | 1 209 198 A1 | | 5/2002 |
| EP | 1209198 A1 | * | 5/2002 |
| JP | 2000-178499 | | 6/2000 |
| JP | 2001240630 A | * | 9/2001 |
| JP | 2002013096 A | * | 1/2002 |

* cited by examiner

*Primary Examiner*—Ling-Siu Choi
(74) *Attorney, Agent, or Firm*—Occhiuti Rohlicek & Tsao LLP

(57) ABSTRACT

The object of the invention is to provide a means to enhance the drying property of a coating film formed as a vibration damper and repressing the occurrence of crack and expansion in the surface of the coating film. The task mentioned above is accomplished by using a thickener for vibration damper, which contains a polymer comprising an alkali-soluble monomer unit and an associating monomer unit. The alkali-soluble monomer unit may possess a carboxyl group, a sulfonic acid group, or a phosphoric acid group, or a salt thereof. The associating monomer unit may possess in a side chain thereof a group represented by the formula, $-(R^1-O)_n-X-R^2$, (wherein $R^1$ denotes methylene group, ethylene group, propylene group or butylene group, n denotes a number in the range of 10-300, X denotes a direct bond, $-C(=O)-$, or $-C(=O)NH-$, and $R^2$ denotes a hydrocarbon group of 6-30 carbon atoms).

39 Claims, No Drawings

THICKENER FOR WATER-BASED VIBRATION DAMPER

BACKGROUND OF THE INVENTION

1. Field of the Invention

This invention relates to a thickener to be contained in a coating material for forming a vibration damper and more particularly to a thickener which is capable of enhancing the drying property of a coating film and repressing the occurrence of a crack and an expansion of the surface of the coating film.

2. Description of the Related Art

The coating material is expected to possess various qualities to suit purposes such as protection, insulation, and beautification. The vibration damper is one of the uses found for the coating material. The term "vibration damper" refers to a material which is disposed on the surface of a material for the purpose of blocking transmission of sound and preventing vibration. The vibration damper is preferred to be disposed on the surface of the chassis of an automobile, for example, with the object of keeping the interior of the automobile quiet.

The sound insulating sheet may be cited as the material which can be utilized as-the vibration damper. The disposal of the sound insulating sheet, however, consumes labor hour. Particularly when this disposal is effected on such a member as the chassis of an automobile which possesses a complicated surface contour, marked decline of productivity cannot be avoided. It is not easily automated and this fact obstructs efforts to cut the cost of production.

The coating film which possesses the quality of a vibration damper, therefore, has been attracting attention. The technique concerning the coating film which functions as a vibration damper has been embodied, for example, by copolymer latex for vibration damper obtained by emulsion polymerizing a monomer mixture comprising a conjugate diene type monomer (a), an ethylenically unsaturated monomer possessing an epoxy group (b), an ethylenically unsaturated carboxylic acid amide monomer (c), and an ethylenically unsaturated monomer (d) other than (b) and (c) at a specific weight ratio (see, the official gazette of JP-2000-178499). The vibration damper is formed by using the coating material incorporating the latex therein. The formation of the vibration damper which is attained by using such a coating material as this excels in productivity and permits automation.

To function effectively as the vibration damper, the coating film is required to:possess a uniform wall thickness. Incidentally, when a thick coating film is to be dried, since it tends to dry gradually from the first surface onward, the part of the coating film in the proximity of the first surface is completely hardened while the inner part of the coating film still retains water. Thus, the vaporization of the water inside the coating film poses the problem of suffering the part of the coating film already hardened in the proximity of the first surface to expand outward and the problem of causing the coating film to sustain a crack. When the coating film expands or cracks, the quality thereof as the vibration damper will be greatly degraded. This mishap deprives the elaborate formation of the coating material with the object of being utilized as the vibration damper of its significance. These problems gain particularly in prominence when the coating film is formed by using an emulsion coating material. The reason for this prominence is that the emulsion coating material tends to succumb to fusion quickly and form a film when the water content encompassing particles is decreased.

SUMMARY OF THE INVENTION

This invention is aimed at providing means for enhancing the drying property of a coating film which is formed as a vibration damper and repressing the occurrence of crack and expansion in the surface of the coating film.

This invention is a thickener for water-based vibration damper, which contains a polymer comprising an alkali-soluble monomer unit and an associating monomer unit.

The coating material, which incorporates the thickener for water-based vibration damper of this invention therein, is capable of drawing water into a network structure to be formed of the thickener. The coating material, therefore, is enabled to enhance the water-retaining property thereof. The coating film, when furnished with a high water-retaining property, continues to dry uniformly while containing water to a certain degree. As a result, the coating material does not easily sustain crack or expansion even when it is formed in a large thickness. That is to say, the coating material, which has incorporated therein the thickener for water-based vibration damper of this invention, does not easily sustain crack and expansion in the surface because it excels in the drying property. Since this coating material sustains crack and expansion only sparingly in the surface, it is capable of providing a vibration damper which excels in vibration damping property and enjoys high quality.

The alkali-soluble monomer unit, when dissolved in an alkaline solution, imparts enhanced viscosity to the resultant solution owing to the mutual repulsion of the negatively charged functional groups. The function of enhancing the viscosity by such a mechanism is very high. Thus, this monomer unit attains a fully satisfactory effect even at a low application rate and lends itself to the cutting of the cost of material and the cost of equipment.

The thickener for water-based vibration damper of this invention further possesses an associating monomer unit. Owing to the mutual association of the hydrophobic groups contained in the associating monomer unit, the function of enhancing viscosity is induced further effectively. Since this mutual association of the hydrophobic groups is a comparatively feeble, the coating material, which contains the thickener for water-based vibration damper of this invention, manifests thixotropic viscosity. This character is highly useful when the coating material is applied by spraying. The coating material manifests low viscosity because it produces strong shearing force during the course of spraying and, therefore, allows easy application to a surface. The coating material, after application to a surface, exhibits high viscosity because of feeble shearing force and, therefore, does not readily induce the phenomenon of sagging on a vertical surface.

DETAILED DESCRIPTION OF THE INVENTION

This invention pertains to a thickener for water-based vibration damper, which contains a polymer comprising an alkali-soluble monomer unit and an associating monomer unit. Now, the thickener for vibration damper contemplated by this invention will be described in detail below. The term "thickener for vibration damper" as used in this specification refers to a "thickener for water-based vibration damper" unless otherwise specified.

The term "alkali-soluble monomer unit" refers to a monomer unit that possesses an acidic functional group or a salt thereof and fulfills the function of enhancing viscosity in an alkaline solution. As concrete examples of the acidic functional group, carboxyl group (—COOH), sulfonic acid group (—SO$_3$H), phosphoric acid group (—PO$_3$H$_2$), and the like may be cited. The salt may be formed by neutralizing the acidic functional group with an alkaline compound, for example. As concrete examples of the salt, sodium salts, potassium salts, and ammonium salts of acidic functional groups may be cited. The acidic functional groups and the salts thereof are not limited to those specifically enumerated above. Among these acidic functional groups and the salts thereof cited above, carboxyl group and salts thereof prove particularly advantageous. The reason for this preference is that the monomers using carboxyl group or a salt thereof exhibit low hydrophilicity and show high stability during the course of polymerization as compared with the monomers containing other acid groups. In the monomers which possess a carboxyl group or a salt thereof, acrylic acid and methacrylic acid and salts thereof prove particularly advantageous because they exhibit satisfactory copolymerizability with other monomers.

The alkali-soluble monomer unit may be formed solely of a monomer unit possessing an acidic functional group and may tolerate the absence of a monomer unit possessing a salt thereof. Conversely, the alkali-soluble monomer unit maybe formed solely of a monomer unit possessing a salt thereof and may tolerate the absence of a monomer unit possessing an acidic functional group. The alkali-soluble monomer unit otherwise may comprise both a monomer unit possessing an acidic functional group and a monomer unit possessing a salt thereof.

The alkali-soluble monomer unit is formed by polymerizing a polymerizing monomer possessing such a functional group. The salt is formed by first forming a polymer and then neutralizing the acid contained in the alkali-soluble monomer unit. The polymer may be formed by using a monomer which has been neutralized in advance.

Now, the function of enhancing viscosity which is induced by the alkali-soluble monomer unit will be briefly explained below. When the alkali-soluble monomer unit is present in an alkaline solution, the acidic functional group possessed by the alkali-soluble monomer unit exists in an ionized state. The carboxyl group (—COOH), for example, is made to exist in the form of an anion (—COO$^-$) owing to such a base as NaOH. Since —COO$^-$ bears a negative electric charge, the polymer which possesses the alkali-soluble monomer unit is diffused in the solution by electrical repulsion. As a result, the solution gains in viscosity.

The monomers which are usable as a raw material for forming the alkali-soluble monomer unit include monomers possessing a carboxyl group such as acrylic acid, methacrylic acid, acryloxy propionic acid, citraconic acid, itaconic acid, crotonic acid, maleic acid, and maleic anhydride; monomers possessing a sulfonic acid group such as vinyl sulfonic acid, styrene sulfonic acid, and sulfoethyl (meth)acrylate; and monomers possessing a phosphoric acid group such as mono (2-methacryloyloxyethyl) phosphate, mono(2-acryloyloxyethyl) phosphate, 2-(meth)acryloyloxy propyl phosphate, 2-(meth)acryloyloxy-3-chloropropyl phosphate, and 2-(meth)acryloyloxyethyl phenyl phosphate. Sodium salt, potassium salts, and ammonium salts of these monomers are included as well. The monomers which are usable as a raw material for the alkali-soluble monomer unit do not need to be limited to those enumerated above but are only required to exhibit a polymerizing property and possess an acidic functional group or a salt thereof. These monomers may be used as a raw material either singly or in the form. of a mixture of two or more members.

The term "associating monomer unit" refers to a monomer unit that possesses a hydrophobic group in a side chain and, owing to this hydrophobic group, enables a plurality of polymers to be associated. As hydrophobic groups which permit this association of polymers, the groups represented by the following formula (I) may be cited.

$$—(R^1—O)_n—X—R^2 \quad\quad (I)$$

In the formula (I), R$^1$ denotes a methylene group (—CH$_2$—), an ethylene group (—CH$_2$CH$_2$—), a propylene group (—CH$_2$CH(CH$_3$)—), or a butylene group (—CH$_2$CH (CH$_2$CH$_3$)—). Among those groups mentioned above, the ethylene group proves particularly preferable by reason of its ease of acquisition. When R$^1$ is an ethylene group, the repeating unit represented by (R$^1$—O) is ethylene oxide. R$^1$ may be formed of a plurality of functional groups. The aforementioned (R$^1$—O)$_n$, for example, may be the combination of ethylene oxide and propylene oxide.

The subscript n denotes the number of repeating units represented by (R$^1$—O). This number n is preferably in the range of 10-300, more preferably in the range of 10-100, still more preferably in the range of 20-80, particularly preferably in the range of 40-60, and most preferably in the range of 45-55.

The symbol X denotes a direct bond, —C(=O)—or—C (=O)NH—.

R$^2$ denotes a hydrocarbon group of 6-30 carbon atoms. The hydrocarbon groups represented by this symbol embrace straight, branched, and cyclic alkyl groups, aryl groups, and alkylaryl groups. These hydrocarbon groups may be partially substituted unless the substitution obstructs the function of association caused by the associating monomer unit. The straight alkyl groups include hexyl group, heptyl group, octyl group, nonyl group, dodecyl group, and octadecyl group, for example. The branched alkyl groups include 3-methylhexyl group and 4,4-diethyloctyl group, for example. The cyclic alkyl groups include cyclooctyl group, cholestanyl group, and lanostanyl group, for example. The aryl groups include phenyl group, naphthyl group, and anthryl group. The alkylaryl groups include dodecylphenyl group, and nonylphenyl group. In consideration of efficient association, R$^2$ denotes preferably a hydrocarbon group of 8-30 carbon atoms, more preferably an alkyl group of 12-30 carbon atoms, still more preferably an alkyl group of 12-20 carbon atoms, particularly preferably an alkyl group of 16-20 carbon atoms, and most preferably an alkyl group of 18 carbon atoms.

Now, the function of enhancing viscosity induced by the associating monomer unit will be briefly explained below. In the associating monomer unit, the part which is actually associated is the part of R$^2$ in the formula (I). Since R$^2$ is a hydrophobic functional group like dodecyl group, the polymer dispersed in the solution participates in the association by utilizing the hydrophobicity possessed by R$^2$. Since the association between hydrophobic groups is a comparatively feeble, the thickener for vibration damper of this invention is enabled to manifest thixotropic viscosity.

The repeating unit represented by (R$^1$—O) is a moiety which heightens the freedom of migration of R$^2$ so as to facilitate the association. When R$^2$ is directly bound to the main chain or located near the main chain, it cannot be freely migrated even if it possesses hydrophobicity. Thus, two or more occurrences of R$^2$cannot be mutually associated satisfactorily. In contrast, when two or more occurrences of R2 are separated properly from the part of the main chain, they can be mutually associated satisfactorily.

The preferred specific mode of the associating monomer unit is represented by the following formula (II),

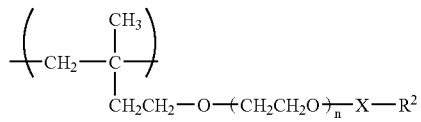

The monomer unit represented by the formula (II) possesses in a side chain a functional group of the formula (I) in which $R^1$ denotes an ethylene group. In the formula (II), the symbols n, X, and $R^2$ have the same definitions as mentioned above and, therefore, require no explanation.

The polymer, which is used as the thickener for vibration damper, may possess still other monomer unit. For example, it may possess a monomer unit originating in an ethylenically unsaturated monomer, which is copolymerizable with the monomer that is the raw material for the alkali-soluble monomer unit, the associating monomer unit, and the salt of an alkali-soluble monomer unit (hereinafter the monomer unit is mentioned occasionally as "ethylenically unsaturated monomer unit"). When the polymer possesses an ethylenically unsaturated monomer unit, it exhibits proper stability for polymerization.

As concrete examples of the ethylenically unsaturated monomer, styrene type polymerizing monomers such as styrene, vinyl toluene, α-methyl styrene, ethylvinyl benzene, and chloromethyl styrene; (meth)acrylamide type polymerizing monomers such as (meth)acryl amide, N-monomethyl (meth)acryl amide, N-monoethyl (meth)acryl amide, and N,N-dimethyl (meth)acryl amide; (meth)acrylic ester type polymerizing monomers such as methyl (meth)acrylate, ethyl (meth)acrylate, and butyl (meth)acrylate which are esters of (meth)acrylic acid with alcohols of 1-8 carbon atoms; cyclohexyl group-containing polymerizing monomers such as cyclohexyl (meth)acrylate; hydroxyl group-containing (meth)acrylic ester type polymerizing monomers such as 2-hydroxyethyl (meth)acrylate and 2-hydorxypropyl (meth) acrylate; polyethylene glycol chain-containing polymerizing monomers such as polyethylene glycol (meth)acrylic ester which are monoesters of (meth)acrylic acid with polyalkylene glycol; vinyl acetate; (meth)acrylonitrile; basic polymerizing monomers such as N-vinyl pyrrolidone, dimethylaminoethyl (meth)acrylate, dimethylaminoethyl (meth)acryl amide, dimethylaminopropyl (meth)acryl amide, vinyl pyridine, and vinyl imidazole; cross-linking (meth)acryl amide type polymerizing monomers such as N-methylol (meth) acryl amide and N-butoxy methyl (meth)acryl amide; hydrolyzing silicon group-containing polymerizing monomers possessing a functional group directly bound to a silicon atom such as vinyl trimethoxy silane, vinyl triethoxy silane, γ-(meth)acryloylpropyl trimethoxy silane, vinyl tris(2-methoxyethoxy) silane, and allyl triethoxy silane; epoxy group-containing polymerizing monomers such as glycidyl (meth) acrylate and allylglycidyl ether; oxazolin group-containing polymerizing monomers such as 2-isopropenyl-2-oxazolin and 2-vinyl oxazolin; azilidine group-containing polymerizing monomers such as 2-azilidinyl ethyl (meth)acrylate and (meth)acryloyl azilidine; and halogen-containing polymerizing monomers such as vinyl fluoride, vinylidene fluoride, vinyl chloride, and vinylidne chloride may be cited. Two or more of these ethylenically unsaturated monomers may be used simultaneously. Other monomers may be used as the raw material.

The polymer that is used as the thickener for vibration damper may possess a cross-linking monomer unit. The cross-linking monomer unit can be formed of a polyfunctional monomer that possesses two or more polymerizing unsaturated groups in the molecular unit thereof. As concrete examples of the polyfunctional monomer, (meth)acrylic ester type monomers such as the esters of (meth)acrylic acid with such polyhydric alcohols as ethylene glycol, 1,3-butylene glycol, diethylene glycol, 1,6-hexsane diol, neopentyl glycol, polyethylene glycol, propylene glycol, polypropylene glycol, trimethylol propane, pentaerythritol, and dipentaerythritol; (meth)acrylic acid amide type monomers such as methylene (meth) acryl amide; allyl type polymerizing monomers such as diallyl phthalate, diallyl maleate, and diallyl fumarate; and allyl (meth)acrylate and divinyl benzene may be cited. Two or more of these cross-linking monomers may be used simultaneously. The cross-linking monomer unit is not limited to those enumerated above but is only required to be capable of cross-linking adjacent polymer chains.

The polymer, which is used as the thickener for vibration damper, is composed of the monomer units described above. For the sake of information, the polymer which is composed of a monomer unit originating in methacrylic acid, a monomer unit satisfying the aforementioned formula (II) by having 50 for n, —C(=O)— for X, and —$C_{17}H_{35}$ for $R^2$, and a monomer unit originating in ethyl acrylate, for example, is represented by the following formula.

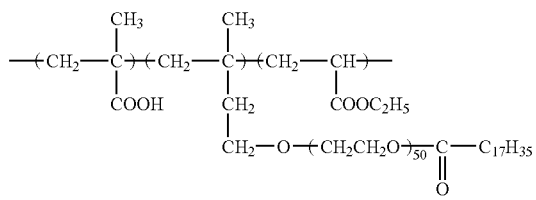

The thickener for vibration damper contemplated by this invention is formed of a polymer which possesses an alkali-soluble monomer unit and an associating monomer unit. The term "thickener for vibration damper" embraces in the concept thereof not only a polymer as a simple substance but also a solution like an emulsion which contains the polymer. The thickener for vibration damper of this invention is generally used as borne in water.

Now, the percentage composition of the component monomer units of the polymer, which is used as the thickener for vibration damper of this invention, will be described below. The polymer used as the thickener essentially contains an alkali-soluble monomer unit and an associating monomer unit. The polymer may contain other monomer units such as a monomer unit originating in an ethylenically unsaturated monomer.

The proportion of the alkali-soluble monomer unit to be incorporated to the total amount of all the monomer units is preferably 20-69 mol % and more preferably 25-64 mol %. If the proportion of the alkali-soluble monomer unit to be incorporated is unduly low, the shortage will possibly result in preventing the ability to enhance viscosity from being acquired fully satisfactorily because this monomer is not easily dissolved. Conversely, if the proportion of the alkali-soluble monomer unit to be incorporated is unduly high, the excess will possibly result in disabling retention of stability of polymerization during the course of emulsion polymerization. When two or more of alkali-soluble monomer units are simultaneously used, the total amount of the plurality of alkali-soluble monomer units is preferred to satisfy the range mentioned above.

The proportion of the associating monomer unit to be incorporated to the total amount of all the monomer units is preferably 0.001-2.0 mol % and more preferably 0.005-1.5 mol %. If the proportion of the associating monomer unit to be incorporated is unduly low, the shortage will possibly prevent the associating monomer unit from improving viscosity fully satisfactorily because the amount of the hydrophobic group in the polymer is not sufficient. Conversely, if the proportion of the associating monomer unit to be incorporated is unduly high, the excess will possibly result in rendering production of a copolymer by emulsion polymerization difficult to achieve, exalting mutual association of hydrophobic groups included in one polymer, and degrading the effect of heightening viscosity.

The proportion of the ethylenically unsaturated monomer to be incorporated to the total amount of all the monomer units is preferably 30-79 mol % and more preferably 35-74 mol %. If the proportion of the ethylenically unsaturated monomer unit to be incorporated is unduly low, the shortage will possibly result in disabling retention of stability of polymerization in the course of emulsion polymerization. Conversely, if the proportion of the ethylenically unsaturated monomer unit is unduly high, the excess will possibly result in preventing the ability to enhance viscosity from being attained fully satisfactorily because the monomer unit is not easily dissolved in an alkali.

The weight average molecular weight of the polymer which has a thickening property in the thickener for vibration damper contemplated by this invention is preferably not less than 3,000, more preferably not less than 10,000, and more preferably not less than 100,000. When a cross-linking monomer is used, however, the molecular weight grows so high as to defy determination by GPC.

The polymer as the thickener is obtained by polymerizing monomer components. The method for polymerizing such monomer components is not particularly restricted. The polymerization can be accomplished by means of emulsion polymerization, reversed-phase suspension polymerization, suspension polymerization, solution polymerization, aqueous solution polymerization, and bulk polymerization, for example. Among these methods of polymerization enumerated above, the emulsion polymerization proves particularly advantageous. The emulsion polymerization allows low viscosity for handling and enjoys low cost of production besides being capable of enabling a copolymer of a high molecular weight to be polymerized at a high concentration. Even when the polymer is produced by the emulsion polymerization, the procedure employed for the production is not particularly restricted. The production may be accomplished, for example, by preparing an aqueous solution having a prescribed amount of the monomer dissolved therein, forming a pre-emulsion of the aqueous solution by the use of an emulsifier, and then adding the pre-emulsion and a polymerization initiator together and causing a reaction of polymerization to proceed in the resultant mixture. The proportions of the component monomers to be incorporated are decided in accordance with the percentage composition of the component monomer units of the polymer which has been described above.

As the alkali-soluble monomer unit, the ethylenically unsaturated monomer, etc., relevant commercially available pharmaceutical preparations may be utilized or relevant raw materials may be prepared on the part of the producer himself.

As the associating monomer unit, relevant commercially available pharmaceutical preparations may be adopted. Alternatively, this monomer unit may be synthesized in accordance with such a known method as is disclosed in the official gazette of JP-A-2001-240630.

Now, the emulsifier, polymerization initiator, and conditions for polymerization, which are employed in producing a polymer as a thickener by emulsion polymerization, will be described below.

The emulsion polymerization is carried out in an aqueous medium. The aqueous medium is not particularly restricted. As concrete examples of the aqueous medium, water, one kind of solvent or a mixture of two or more kinds of solvent which is miscible with water, and a mixed solvent formed by mixing such a solvent with water in a manner such that the water may constitute a main component may be cited. Among other aqueous media enumerated above, water proves particularly advantageous.

The emulsifier is not particularly restricted but may be selected arbitrarily from among various known emulsifiers. As concrete examples of the emulsifier, anionic surfactants, nonionic surfactants, cationic surfactants, amphoteric surfactants, macro-molecular surfactants, other similar reactive surfactants may be cited. Two or more of these emulsifiers may be simultaneously used.

The anionic surfactants include alkyl sulfates such as sodium dodecyl sulfate, potassium dodecyl sulfate, and ammonium alkyl sulfates; sodium dodecyl polyglycol ether sulfate; sodium sulforicinate; alkyl sulfonates such as paraffin sulfonate; alkyl sulfonates such as alkali metal sulfates of sodium dodecyl benzene sulfonate and alkali phenol hydroxyethylene; higher alkyl naphthalene sulfonates; naphthalene-formalin sulfonate condensate; fatty acid salts such as sodium laurate, triethanol amine oleate, and triethanol amine abietate; esters of polyoxyalkyl ether sulfuric acid; sulfuric esters of esters of polyoxyethylene carboxylic acid; esters of polyoxyethylene phenyl ether sulfuric acid; succinic acid dialkyl ester sulfonates; and polyoxyethylene alkyl aryl sulfates. The anionic surfactant is not restricted to those enumerated above. Two or more of such anionic surfactants may be used simultaneously.

The nonionic surfactants include polyoxyethylene alkyl ethers; polyoxyethylene alkyl aryl ethers; sorbitan fatty acid esters; polyoxyethylene sorbitan fatty acid esters; aliphatic monoglycerides such as monolaurates of glycerol; polyoxyethylene-oxypropylene copolymer; and products of condensation between ethylene oxide and aliphatic amine, amide, or acid. The nonionic surfactant is not restricted to those enumerated above. Two or more of such nonionic surfactants may be used simultaneously.

The cationic surfactants include dialkyl dimethyl ammonium salts, ester type dialkyl ammonium salts, amide type dialkyl ammonium salts, and dialkyl imidazolinium salts. The cationic surfactant is not restricted to those enumerated above. Two or more of these cationic surfactants may be used simultaneously.

The amphoteric surfactants include alkyldimethylaminoacetic acid betaines, alkyldimethyl amine oxides, alkylcarboxymethyl hydroxyethyl imidazolinium betaine, alkylamide propyl betaine, and alkylhydroxysulfobetaine. The amphoteric surfactant is not restricted to those enumerated above. Two or more of these amphoteric surfactants may be used simultaneously.

The macromolecular surfactants include polyvinyl alcohols and modified products thereof; (meth) acrylic acid type water-soluble macromolecular compounds; hydroxyethyl (meth)acrylic acid type water-soluble macromolecular compounds; hydroxypropyl (meth)acrylic acid type water-soluble macromolecular compounds; and polyvinyl pyrrolidone. The macromolecular surfactant is not restricted to those enumerated above. Two or more of these macromolecular surfactants may be used simultaneously.

Among these emulsifiers enumerated above, a reactive emulsifier is preferably used. From the standpoint of environmental safety, it is particularly advantageous to use a non-nonylphenyl type emulsifier.

The polymerization initiator is not particularly restricted but is only required to be a substance that is thermally decomposed and consequently made to emit radical molecules. For the emulsion polymerization, a water-soluble initiator is favorably used. The polymerization initiators include persulfates such as potassium persulfate, ammonium persulfate, and sodium persulfate; water-soluble azo compounds such as 2,2'-azobis(2-amidinopropane) dihydrochloride and 4,4'-azobis(4-cyanopentanoic acid); thermally decomposing initiators such as hydrogen peroxide; and redox type polymerization initiators formed between hydrogen peroxide and ascorbic acid, t-butyl hydroperoxide and rongalite, potassium persulfate and a metal salt, and ammonium persulfate and sodium hydrogen sulfite. The polymerization initiator is not restricted to those enumerated above. Two or more of these polymerization initiators may be used simultaneously. The amount of the polymerization initiator to be used is not particularly restricted but may be properly set depending on the kind of polymerization initiator. It is used, for example, in an amount preferably in the range of 0.1-2 parts by mass and more preferably in the range of 0.2-1 parts by mass, based on the total amount of all the monomers used taken as 100 pasts by mass.

The emulsion polymerization to be effected with the object of producing the thickener for vibration damper is carried out, as occasion demands, in the presence of a chelating agent such as sodium ethylenediamine tetraacetate, a dispersant such as sodium polyacrylate, and an inorganic salt. As concrete examples of the method for adding monomers and polymerization initiator, the method of block addition, the method of continuous addition, and the method of multistage addition may be cited. Optionally, these methods of addition may be properly combined to suit actual use.

The polymerizing temperature during the emulsion polymerization is not particularly restricted. This polymerizing temperature is preferably in the range of 0-100° C. and more preferably in the range of 40-95° C. The polymerization time isn't also particularly restricted. This polymerization time is properly in the range of 3-15 hours. During the emulsion polymerization, it is permissible to add to the system a hydrophilic solvent and additives in amounts incapable of exerting an adverse effect on the properties of the polymer to be obtained. The method for adding monomer components to the reaction system of emulsion polymerization is not particularly restricted but may be arbitrarily selected from among such known methods as block addition, dropwise addition of monomer components, pre-emulsion, power feeding, seed dispersion, and multistage addition.

The content of the non-volatile component in the emulsion resulting from the reaction of emulsion polymerization, namely the polymer as a thickener, is preferred to be not more than 60 mass %. If the content of the non-volatile component exceeds 60 mass %, the excess will possibly result in disrupting retention of the stability of dispersion and consequently inducing coagulation because the viscosity of the emulsion is unduly high. The average particle diameter of the emulsion mentioned above is not particularly restricted. It is preferably in the range of 10 nm-1 µm and more preferably in the range of 20-500 nm. If the average particle diameter of the emulsion falls short of 10 nm, the shortage will possibly result in unduly heightening the viscosity of the emulsion and disrupting retention of the stability of dispersion and inducing coagulation as well. Conversely, if the average particle diameter exceeds 1 µm, the excess will result in depriving the emulsion of its entity.

During the course of the emulsion polymerization, it is permissible to use a chain transfer agent in an amount in the range of 0.001-2 mass parts, based on 100 mass parts of the monomer component with the object of decreasing the molecular weight. As concrete examples of the chain transfer agent, halogen-substituted alkanes such as carbon tetrachloride, bromoform, and bromotrichloroethane; alkyl mercaptans such as n-dodecyl mercaptan, tert-dodecyl mercaptan, octyl mercaptan, tetradecyl mercaptan, and hexadecyl mercaptan; thioesters of alkyl monothioglycolic acids such as butyl thioglycolate, isooctyl thioglycolate, and dodecyl thioglycolate; alcohols such as methanol, ethanol, and isopropanol; and α-methylstyrene dimer, terpinol, terpinene, and dipentene may be cited. The chain transfer agent is not restricted to those enumerated above. Two or more of these chain transfer agents maybe used simultaneously.

The thickener for vibration damper of this invention is compounded with other components as shown in working examples to form a composition for vibration damper composition such as, for example, a emulsion coating material for vibration damper. The other components used for this compounding include solvent; water-based copolymer latex; plasticizer; stabilizing agent; wetting agent; preservative; antifoaming agent; inorganic filler; coloring agent, dispersant; rust-proofing pigment; defoaming agent; age-resister; antifungal agent; ultraviolet absorbent; and antistatic agent. The composition for vibration damper preferably contains at least a thickener for water-based vibration damper contemplated by this invention, a water-based copolymer latex, and an inorganic filler.

These substances for the compounding may be properly selected from well-known materials. As concrete examples of the solvent, ethylene glycol, butyl cellosolve, butyl carbitol, and butyl carbitol acetate may be cited. As concrete examples of the water-based copolymer latex, styrene/butadiene copolymer latex, (meth)acrylic acid type copolymer emulsion, styrene/(meth)acrylic acid type copolymer emulsion, and vinyl acetate type copolymer emulsion may be cited. Two or more of these copolymer latexes may be used as blended. Two or more of these copolymer latexes may be compounded by multistage polymerization. As concrete examples of the inorganic filler, inorganic fillers such as calcium carbonate, kaolin, silica, talc, barium sulfate, alumina, iron oxide, titanium oxide, glass powder, magnesium carbonate, aluminum hydroxide, talc, diatomaceous earth, and clay; scaly inorganic fillers such as glass flakes and mica; and fibrous inorganic fillers such as metal oxide whiskers and glass fibers may be cited. As concrete examples of the coloring agent, organic and inorganic coloring agents such as titanium oxide, carbon black, iron oxide red, Hansa yellow, benzine yellow, phthalocyanine blue, and quinacridon red may be cited. As concrete examples of the dispersant, inorganic dispersant such as sodium hexamethaphosphate and sodium tripolyphosphate and organic dispersing agents such as polycarboxylic acid type dispersing agents may be cited. As concrete examples of the rust-proofing pigment, metal salts of phosphoric acid, metal salts of molybdic acid, and metal salts of boric acid may be cited. As concrete examples of the defoaming agent, silicon type defoaming agents and the like may be cited.

The composition for vibration damper contains solid components in an amount preferably in the range of about 40-90 mass %, more preferably in the range of about 50-85 mass %, and still more preferably in the range of about 60-80 mass %. The pH value of the composition for vibration damper is preferably in the range of 7-11 and more preferably in the range of 8-10.

The amounts of the components to be incorporated in the composition for vibration damper is not particularly restricted. The components are incorporated in the amounts in general use in due consideration of the quality which the composition is expected to acquire. The amount of the thickener for vibration damper of this invention to be incorporated, for example, is preferably in the range of 0.01-2 parts by mass, more preferably in the range of 0.05-1.5 parts by mass, and still more preferably in the range of 0.1-1 part by mass, as reduced to a solid content, based on 100 parts by mass of the solid component of the composition for vibration damper. The amount of the water-based copolymer latex to be incorporated is preferably in the range of 10-60 parts by mass, more preferably in the range of 15-55 parts by mass, and still more preferably in the range of 20-50 parts by mass as reduced to a solid content, based on 100 parts by mass of the solid components of the composition for vibration damper. The amount of the inorganic filler to be incorporated is preferably in the range of 40-90 parts by mass, more preferably in the range of 45-85 parts by mass, and still more preferably in the range of 50-80 parts by mass, based on 100 parts by mass of the solid components of the composition for vibration damper. The preceding statement is not meant to limit the relevant amounts of incorporation within the respectively specified ranges.

The composition for vibration damper is also preferred to contain a polyvalent metal compound. The presence of this compound in the composition improves the composition for vibration damper in stability, dispersibility, and property of being dried by heating and improves as well the vibration damper formed of the compound in property of restraining vibration. The polyvalent metal compound is not particularly restricted. As concrete examples of the polyvalent metal compound, zinc oxide, zinc chloride, and zinc sulfate may be cited. Two or more of these polyvalent metal compounds may be combined to suit actual use.

The form of the polyvalent metal compound mentioned above is not particularly restricted but may be properly selected from among such known forms as powder, dispersion in water, and dispersion in emulsion. Among other forms enumerated above, the dispersion in water or the dispersion in emulsion is preferably adopted and the dispersion in the emulsion is more preferably adopted by reason of improved dispersibility of the polyvalent metal compound in the composition for vibration damper. The amount of the polyvalent metal compound to be used is preferably in the range of 0.05-5.0 parts by mass and more preferably in the range of 0.05-3.5 parts by mass, based on 100 parts by mass of the solid components in the compound for vibration damper.

The device to be used for mixing different components is not particularly restricted but may be properly selected from among such known devices as butterfly mixer, planetary mixer, spiral mixer, kneader, and dissolver to suit actual use.

The water-based copolymer latex is not particularly restricted. It may be produced by consulting the method for production of water-based copolymer latex disclosed in the official gazette of JP-A-2000-355602. For example, the polymerization may be initiated in a flask, which has been charged in advance with an acid component as a hydrophilic component. It is naturally permissible to produce the water-based copolymer latex by using a novel method of manufacture. The water-based copolymer latex is compounded with a thickener that excels in various qualities such as the property of retaining water and the property of enhancing viscosity. Even when the coating film is formed in a large thickness, therefore, it is capable of providing a vibration damper, which allows no easy occurrence of crack and expansion and excels in the ability of restraining vibration. The water-based copolymer latex tends to fuse immediately and form a film when the water content thereon in the proximity of particles. When the water-based copolymer latex of this quality is used to form a coating film, therefore, this invention proves particularly useful. The composition for vibration damper, as occasion demands, may have the thickener for vibration damper of this invention incorporated therein in advance.

By causing the composition for vibration damper to be applied to a base and then dried, a coating film, which functions as a vibration damper, is formed. The base used in this case is not particularly restricted. For the purpose of applying the composition for vibration damper to the base, a brush, spatula, air spray, airless spray, mortar gun, or lysine gun may be used.

The composition for vibration damper which is prepared by using the thickener for vibration damper contemplated by this invention is applied, through not exclusively, to automobile floors, railway vehicles, ships, aircraft, electrical appliances, building constructions, and construction equipment.

The coating film, which is formed by using the composition for vibration damper contemplated by this invention, excels in the property of restraining vibration. The loss factor (tan δ) involved in the formation of this coating film is preferably 0.15 or more, more preferably 0.16 or more, and still more preferably 0.18 or more. The loss factor signifies the excellence of the property of restraining vibration which exalts in accordance as the magnitude thereof increases. The loss factor can be calculated by the method described in a working example.

The amount of the coating material for vibration damper to be used for coating is set to suit the purpose of use and the expected performance. To be specific, the amount is such that the coating sheet, on drying, acquires a thickness preferably in the range of 0.5-5.0 mm and more preferably in the range of 1.5-4.5 mm.

For the purpose of forming the coating sheet by applying the coating material for vibration damper to a base and then drying the applied layer of the coating material, the applied layer may be dried either by heating or by standing at normal room temperature. From the viewpoint of efficiency, the drying by heating proves advantageous. The coating material for vibration damper, which is formed by using the composition for vibration damper of this invention, excels in the property of drying and allowing no easy occurrence of expansion and crack even when the drying is effected by forced heating. When the drying by heating is adopted, therefore, it proves particularly advantageous. The temperature of the drying by heating is preferably in the range of 80-210° C. and more preferably in the range of 110-160° C.

EXAMPLES

The effect of this invention will be explained with reference to the working examples and comparative examples adduced herein below. In the following examples, the term "parts" refers to "parts by mass" unless otherwise specified.

Example 1

Synthesis of Polymer Possessing an Alkali-soluble Monomer Unit and an Associating Monomer Unit A four-neck separable flask provided with a stirrer, a thermometer, a refrigerating machine, a nitrogen inlet tube, and a dropping funnel was charged with deionized water (115 parts) and ammonium sulfonate salt of polyoxyethylene dodecyl ether (1.5 parts). The reactants in the flask were kept stirred at an inner temperature of 68° C. and swept gently with nitrogen till the interior of the reaction vessel was thoroughly displaced with nitrogen. Then, ammonium sulfonate salt of polyoxyethylene dodecyl ether (1.5 parts) was dissolved in deionized water (92 parts).

A mixture of methacrylic acid (40 parts), the combination product of ester with octadecyl polyoxyethylene (3-methyl-3-butenyl) ether (adduct of 50 mols of ethylene oxide) (10 parts), and ethyl acrylate (50 parts) as monomers for a polymer was introduced into the resultant solution and they were stirred together to prepare a pre-emulsion. Incidentally, the methacrylic acid was the raw material for an alkali-soluble monomer unit, the octadecyl polyoxyethylene (3-methyl-3-butenyl) ether was the raw material for an associating monomer unit, and the ethyl acrylate was the raw material for an ethylenically unsaturated monomer unit. The combination product of ester with octadecyl polyoxyethylene (3-methyl-3-butenyl) ether (adduct of 50 mols of ethylene oxide) had the following structure.

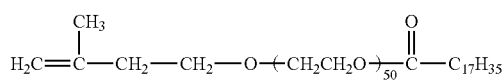

In the reaction vessel, 5% of the pre-emulsion containing the monomers for polymer was stirred for 5 minutes and then sodium hydrogen sulfite (0.017 part) was introduced into the stirred pre-emulsion. Separately, an aqueous solution of polymerization initiator was prepared by mixing ammonium persulfate (0.23 part) with deionized water (23 parts). In the reaction vessel mentioned above, 5% of the aqueous polymerization initiator solution was added and stirred for 20 minutes to effect initial polymerization. The remainder of the pre-emulsion and the aqueous initiator solution were uniformly added dropwise over a period of two hours into the reaction vessel while the inner temperature of the reaction vessel was kept at 72° C. After the dropwise addition was completed, the dropping funnel was washed with deionized water (8 parts) and the washings were introduced into the reaction vessel. The reaction mass in the reaction vessel was continuously stirred for one more hour with the inner temperature of the reaction vessel kept at 72° C. and then cooled to complete the reaction. Consequently a thickener for vibration damper 1 having a non-volatile content of 30% was obtained.

Example 2

Synthesis of Polymer Possessing an Alkali-soluble Monomer Unit and an Associating Monomer Unit A thickener for vibration damper 2 was obtained by following the procedure of Example 1 while using methacrylic acid (40 parts), the combination product of ester with octadecyl polyoxyethylene acrylate (adduct of 50 mols of ethylene oxide) (10 parts), and ethyl acrylate (50 parts) as monomers for a polymer in the place of methacrylic acid (40 parts), the combination product of ester with octadecylpolyoxyethylene (3-methyl-3-butenyl) ether (adduct of 50 mols of ethylene oxide) (10 parts), and ethyl acrylate (50 parts).

Comparative Example 1

Synthesis of Thickener not Possessing Associating Monomer Unit

A comparative thickener for vibration damper 3 was obtained by following the procedure of Example 1 while using methacrylic acid (35 parts) and ethyl acrylate (65 parts) as monomers for a polymer in the place of methacrylic acid (40 parts), the combination product of ester with octadecylpolyoxyethylene (3-methyl-3-butenyl) ether (adduct of 50 mols of ethylene oxide) (10 parts), and ethyl acrylate (50 parts).

[Examples 3 and 4 and Comparative Example 2: Preparation of Emulsion Coating Material for Vibration Damper]

Emulsion coating material for vibration damper, which were composition for vibration damper, were prepared by combining the thickener for vibration damper obtained in Examples 1 and 2 and Comparative Example 1 respectively with other components at the proportions of incorporation shown below.

| (Proportion of incorporation) | |
|---|---|
| Emulsion ("Acryset DC-172" made by Nippon Shokubai Co., Ltd.) | 148 parts |
| Calcium carbonate ("NN#200" made by Nitto Funka Kogyo K.K.) | 240 parts |
| Additive (propylene glycol) | 19 parts |
| Dispersing agent ("Demol EP" made by Kao Co., Ltd.) | 4.3 parts |
| Thickener for vibration damper | 7 parts |
| Defoaming agent (Nopuko 8034L" made by San Nopuko K.K.) | 0.3 parts |

In Comparative Example 2, the thickener for vibration damper was incorporated in 14 parts. The increased amount was necessary for adjusting the viscosity of the emulsion coating material for vibration damper to a prescribed degree.

The prepared emulsion coating materials for vibration damper were severally rated for the drying property and the loss factor of the coating film formed of the relevant coating material. The methods for determination of the items of rating were as follows. The results of the rating are shown collectively in Table 1.

[Drying Property]

On a steel plate ("SPCC-SD" made by Nippon Test Panel K.K.; measuring 75 mm in width×150 mm in length×0.8 mm in thickness), a given emulsion coating material for vibration damper was applied in three thicknesses, 1.5 mm, 3.0 mm, and 4.5 mm. Then, the applied layers of the emulsion coating material for vibration damper were dried by the use of a hot air drier at 150° C. for 30 minutes. The resultant dried coating films were rated to determine whether or not they sustained expansion and crack, by using the four-point scale, wherein ◎ stands for total absence of expansion or crack, ○ for substantial absence of expansion or crack, Δ for slight occurrence of expansion and crack, and X for occurrence of many expansions and cracks.

[Loss Factor]

On a steel plate ("SPCC-SD" made by Nippon Test Panel K.K.; measuring 15 mm in width×250 mm in length×0.8 mm in thickness), a given emulsion coating material for vibration damper was applied in a thickness of 3.0 mm. Then, the applied layer of the emulsion coating material for vibration damper was dried by the use of a hot air drier at 150° C. for 30 minutes. The dried coating film consequently obtained was rated by means of loss factor. The loss factor was measured in an environment at 25° C. by the use of a loss factor measuring system made by Ono Sokki K.K. and rated by determining the tan δ by the cantilever technique. The loss factor signified the excellence of the property of restraining vibration in accordance as the magnitude thereof increased.

TABLE 1

| | | | Example 3 | Example 4 | Comparative Example 2 |
|---|---|---|---|---|---|
| Drying property | Thickness of Sheet | 1.5 mm | ◎ | ◎ | Δ |
| | | 3.0 mm | ◎ | ◎ | X |
| | | 4.5 mm | ○ | ◎ | X |
| Loss factor | | | 0.35 | 0.36 | 0.08 |

As shown in Table 1, the coating films formed by using the emulsion coating material for vibration damper of this invention allowed no easy occurrence of crack and expansion and manifested an excellent property of restraining vibration.

The coating materials incorporating therein the thickener for vibration damper of this invention enjoyed an improved water-retaining property and the relevant coating films produced from the coating materials, therefore, allowed no easy occurrence of crack and expansion even when the coating films were formed in a large thickness. Thus, the coating films consequently produced excelled in the property of restraining vibration. Then, owing to the alkali-soluble monomer unit possessed by the thickener for vibration damper of this invention, the relevant solutions attained effective increase of viscosity. Further, owing to the associating monomer unit possessed by the thickener for vibration damper of this invention, still more effective action of enhancing viscosity was induced.

The entire disclosure of Japanese Patent Application No. 2002-281245 filed on Sep. 26, 2002 including specification, claims, drawings and summary are incorporated herein by reference in its entirety.

What is claimed is:

1. A composition for vibration damper, which comprises 0.01-2 parts by mass a thickener for water-based vibration damper containing an emulsion having a polymer comprising 20-69 mol % an alkali-soluble monomer unit and 0.001-2.0 mol % an associating monomer unit, 10-60 parts by mass an water-based copolymer latex, and 40-90 parts by mass an inorganic filler per 100 parts by mass the solid portion of the composition, wherein the solid portion is in the range of 60-85% by mass of the composition.

2. A composition for vibration damper according to claim 1, wherein the associating monomer unit possesses in a side chain thereof a group represented by the following formula (I):

—(R¹—O)ₙ—X—R²  (I)

wherein R¹ denotes at least one group selected from the group consisting of methylene group, ethylene group, propylene group, and butylene group, n denotes a number in the range of 10-300, X denotes a direct bond, —C(=O)—, or —C(=O)NH—, and R² denotes a hydrocarbon group of 6-30 carbon atoms.

3. A composition for vibration damper according to claim 2, wherein the associating monomer unit is represented by the following formula (II):

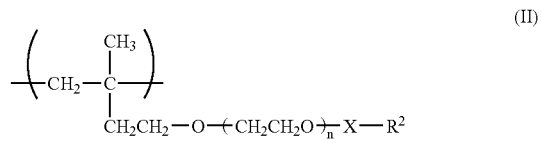

wherein n, X, and R² have the same meanings as defined above.

4. A composition for vibration damper according to claims 1, wherein the polymer further comprises a monomer unit which originates in an ethylenically unsaturated monomer and is copolymerized with the alkali-soluble monomer unit and the associating monomer unit.

5. A composition for vibration damper according to claim 4, wherein the proportion of the alkali-soluble monomer unit to be incorporated is in the range of 20-69 mol % based on the total amount of all the monomer units, the proportion of the associating monomer unit to be incorporated is in the range of 0.001-2.0 mol % based on the total amount of all the monomer units, and the proportion of the monomer unit originating in the ethylenically unsaturated monomer is in the range of 30-79% based on the total amount of all the monomer units.

6. A composition for vibration damper according to claim 2, wherein the alkali-soluble monomer unit is a monomer unit having an acidic functional group or both a monomer unit having an acidic functional group and a monomer unit having a salt thereof.

7. A composition for vibration damper according to claim 1, wherein the average particle diameter of the emulsion is in the range of 10 nm-1 μm.

8. A composition for vibration damper according to claim 1, wherein an amount of the thickener for water-based vibration damper is in the range of 0.05-1.5% by mass.

9. A composition for vibration damper according to claim 1, wherein the polymer has a molecular weight of not less than 100,000.

10. A coating layer for vibration damper prepared from the composition of claim 1, wherein the layer has 1.5-4.5 mm of thickness.

11. A coating layer for vibration damper prepared from the composition of claim 2, wherein the layer has 1.5-4.5 mm of thickness.

12. A composition for vibration damper, which comprises 0.01-2 parts by mass a thickener for water-based vibration damper containing an emulsion having a polymer comprising 20-69 mol % an alkali-soluble monomer unit and 0.001-2.0 mol % an associating monomer unit and 10-60 parts by mass a water-based copolymer latex.

13. A composition of vibration according to claim 12, wherein the associating monomer unit possesses in a side chain thereof a group represented by the following formula (I):

—(R¹—O)ₙ—X—R²  (I)

wherein R¹ denotes at least one group selected from the group consisting of methylene group, ethylene group, propylene group, and butylene group, n denotes a number in the range of 10-300, X denotes a direct bond, —C(=O)—, or —C(=O)NH—, and R² denotes a hydrocarbon group of 6-30 carbon atoms.

14. A composition for vibration damper according to claim 13, wherein the associating monomer unit is represented by the following formula (II):

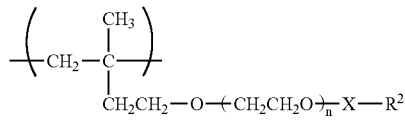

wherein n, X, and $R^2$ have the same meanings as defined above.

15. A composition for vibration damper according to claim 12, wherein the polymer further comprises a monomer unit which originates in an ethylenically unsaturated monomer and is copolymerized with the alkali-soluble monomer unit and the associating monomer unit.

16. A composition for vibration damper according to claim 15, wherein the proportion of the alkali-soluble monomer unit to be incorporated is in the range of 20-69 mol % based on the total amount of all the monomer units, the proportion of the associating monomer unit to be incorporated is in the range of 0.001-2.0 mol % based on the total amount of all the monomer units, and the proportion of the monomer unit originating in the ethylenically unsaturated monomer is in the range of 30-79% based on the total amount of all the monomer units.

17. A composition for vibration damper according to claim 13, wherein the alkali-soluble monomer unit is a monomer unit having an acidic functional group or both a monomer unit having an acidic functional group and a monomer unit having a salt thereof.

18. A composition for vibration damper according to claim 12, wherein the polymer has a molecular weight of not less than 100,000.

19. A coating layer for vibration damper prepared from the composition of claim 12, wherein the layer has 1.5-4.5 mm of thickness.

20. A coating layer for vibration damper prepared from the composition of claim 13, wherein the layer has 1.5-4.5 mm of thickness.

21. A method for increasing viscosity of a composition for vibration damper, which comprises incorporating 0.01-2 parts by mass of a thickener containing an emulsion having a polymer comprising 20-69 mol % of an alkali-soluble monomer unit and 0.001-2.0 mol% of an associating monomer unit into a composition containing 10-60 parts by mass of a water-based copolymer latex.

22. A method according to claim 21, wherein the associating monomer unit possesses in a side chain thereof a group represented by the following formula (I):

wherein $R^1$ denotes at least one group selected from the group consisting of methylene group, ethylene group, propylene group, and butylene group, n denotes a number in the range of 10-300, X denotes a direct bond, —C(=O)—, or —C(=O)NH—, and $R^2$ denotes a hydrocarbon group of 6-30 carbon atoms.

23. A method according to claim 21, wherein the associating monomer unit is represented by the following formula (II):

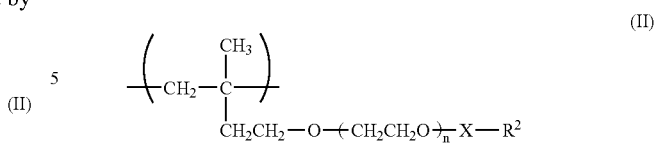

wherein n, X, and $R^2$ have the same meanings as defined above.

24. A method according to claim 21, wherein the polymer further comprises a monomer unit which originates in an ethylenically unsaturated monomer and is copolymerized with the alkali-soluble monomer unit and the associating monomer unit.

25. A method according to claim 24, wherein the proportion of the alkali-soluble monomer unit to be incorporated is in the range of 20-69 mol % based on the total amount of all the monomer units, the proportion of the associating monomer unit to be incorporated is in the range of 0.001-2.0 mol % based on the total amount of all the monomer units, and the proportion of the monomer unit originating in the ethylenically unsaturated monomer is in the range of 30-79% based on the total amount of all the monomer units.

26. A method according to claim 25, wherein the alkali-soluble monomer unit is a monomer unit having an acidic functional group or both a monomer unit having an acidic functional group and a monomer unit having a salt thereof.

27. A method according to claim 21, further comprising adding to the composition 0.05-5.0 parts of a polyvalent metal compound based on 100 parts by mass of the solid components.

28. A method according to claim 27, wherein said polyvalent metal is one member selected from the group consisting of zinc oxide, zinc chloride, zinc sulfate, and calcium carbonate.

29. A method according to claim 21, wherein the polymer has a molecular weight of not less than 100,000.

30. A method for increasing viscosity of a composition for vibration damper, which comprises incorporating 0.01-2 parts by mass of a thickener containing an emulsion having a polymer comprising 20-69 mol % of an alkali-soluble monomer unit and 0.001-2.0 mol % of an associating monomer unit into a composition containing 10-60 parts by mass of a water-based copolymer latex and 40-90 parts by mass of an inorganic filler per 100 parts by mass of the solid portion of the composition, wherein the solid portion is in the range of 60-85 by mass of composition.

31. A method according to claim 30, wherein the associating monomer unit possesses in a side chain thereof a group represented by the following formula (I):

wherein $R^1$ denotes at least one group selected from the group consisting of methylene group, ethylene group, propylene group, and butylene group, n denotes a number in the range of 10-300, X denotes a direct bond, —C(=O)—, or —C(=O)NH—, and $R^2$ denotes a hydrocarbon group of 6-30 carbon atoms.

32. A method according to claim 31, wherein the associating monomer unit is represented by the following formula (II):

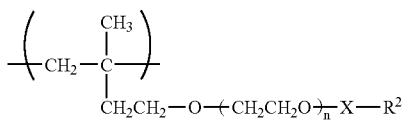

(II)

wherein n, X, and R² have the same meanings as defined above.

33. A method according to claim 30, wherein the polymer further comprises a monomer unit which originates in an ethylenically unsaturated monomer and is copolymerized with the alkali-soluble monomer unit and the associating monomer unit.

34. A method according to claim 33, wherein the proportion of the alkali-soluble monomer unit to be incorporated is in the range of 20-69 mol % based on the total amount of all the monomer units, the proportion of the associating monomer unit to be incorporated is in the range of 0.001-2.0 mol % based on the total amount of all the monomer units, and the proportion of the monomer unit originating in the ethylenically unsaturated monomer is in the range of 30-79% based on the total amount of all the monomer units.

35. A method according to claim 34, wherein the alkali-soluble monomer unit is a monomer unit having an acidic functional group or both a monomer unit having an acidic functional group and a monomer unit having a salt thereof.

36. A method according to claim 30, further comprising adding to the composition 0.05-5.0 parts of a polyvalent metal compound based on 100 parts by mass of the solid components.

37. A method according to claim 36, wherein said polyvalent metal is one member selected from the group consisting of zinc oxide, zinc chloride, zinc sulfate, and calcium carbonate.

38. A method according to claim 30, wherein the inorganic filler is 45-85 parts by mass per 100 parts by mass of the solid portion of the composition.

39. A method according to claim 30, wherein the polymer has a molecular weight of not less than 100,000.

* * * * *